US012093683B2

(12) United States Patent
Hicks et al.

(10) Patent No.: US 12,093,683 B2
(45) Date of Patent: Sep. 17, 2024

(54) MACHINE LEARNING BASED DEPRECATED SOFTWARE IDENTIFICATION

(71) Applicant: International Business Machines Corporation, Armonk, NY (US)

(72) Inventors: Andrew C. M. Hicks, Highland, NY (US); Robert Peter Catalano, Montgomery, NY (US); Tyler Vezio Rimaldi, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 17/122,669

(22) Filed: Dec. 15, 2020

(65) Prior Publication Data

US 2022/0188098 A1 Jun. 16, 2022

(51) Int. Cl.
G06F 9/44 (2018.01)
G06F 8/70 (2018.01)
G06F 11/36 (2006.01)
G06N 5/04 (2023.01)
G06N 20/00 (2019.01)

(52) U.S. Cl.
CPC ............ *G06F 8/70* (2013.01); *G06F 11/3672* (2013.01); *G06N 5/04* (2013.01); *G06N 20/00* (2019.01)

(58) Field of Classification Search
CPC ....... G06F 8/70; G06F 11/3672; G06N 20/00; G06N 5/04
See application file for complete search history.

(56) References Cited

U.S. PATENT DOCUMENTS

| | | |
|---|---|---|
| 5,960,189 A | 9/1999 | Stupek, Jr. |
| 7,246,229 B2 | 7/2007 | Suermondt |
| 9,864,798 B2 | 1/2018 | Hall |
| 10,044,563 B2 | 8/2018 | Guven |

(Continued)

FOREIGN PATENT DOCUMENTS

| | | |
|---|---|---|
| CN | 114637529 A | 6/2022 |
| DE | 102021130665 A1 | 6/2022 |

(Continued)

OTHER PUBLICATIONS

Lawanna, Adtha. "Filtering test case selection for increasing the performance of regression testing." Applied Science and Engineering Progress 9.1 (2016): 19-25. (Year: 2016).*

(Continued)

*Primary Examiner* — Hang Pan
(74) *Attorney, Agent, or Firm* — CANTOR COLBURN LLP; Teddi Maranzano (57) ABSTRACT

An approach to identifying the use of deprecated source code in software repositories and recommending a replacement. Parsing one or more software repositories for software source code, identified as deprecated, by a machine learning model. Responsive to identifying the deprecated software source code, alerting a first one or more software developers responsible for maintaining a software source code module using the deprecated software source code; and recommending an alternative software source code for use in the software source code module to replace the deprecated software source code to the first one or more software developers.

17 Claims, 5 Drawing Sheets

(56) References Cited

U.S. PATENT DOCUMENTS

| | | | |
|---|---|---|---|
| 10,073,974 | B2 | 9/2018 | Hwang |
| 10,983,782 | B1* | 4/2021 | Mitra .................. G06F 8/65 |
| 2009/0293043 | A1* | 11/2009 | Begel .................. G06F 8/71 717/122 |
| 2011/0258601 | A1* | 10/2011 | Ndem .............. G06F 11/3676 717/124 |
| 2012/0117545 | A1* | 5/2012 | Yokoi ............. G06F 11/3684 717/126 |
| 2013/0007700 | A1* | 1/2013 | Villar .............. G06F 16/9535 717/109 |
| 2013/0185246 | A1* | 7/2013 | Salloum ........... G06F 11/3672 706/52 |
| 2014/0082729 | A1 | 3/2014 | Shim |
| 2015/0052372 | A1* | 2/2015 | Barde .................. G06F 8/30 713/320 |
| 2015/0100940 | A1* | 4/2015 | Mockus ............... G06F 8/70 717/101 |
| 2019/0121669 | A1* | 4/2019 | Almasan ............ G06F 9/4881 |
| 2019/0171444 | A1 | 6/2019 | Hegarty |
| 2019/0294536 | A1* | 9/2019 | Avisror ............... G06F 8/433 |
| 2019/0324744 | A1* | 10/2019 | Alam ............... G06F 16/906 |
| 2020/0097261 | A1* | 3/2020 | Smith .............. G06F 40/174 |
| 2020/0110600 | A1 | 4/2020 | Weldemariam |
| 2020/0110601 | A1* | 4/2020 | Shah ............... G06F 11/3612 |
| 2020/0125731 | A1 | 4/2020 | Benameur |
| 2021/0208865 | A1 | 7/2021 | Stylos |
| 2021/0232410 | A1* | 7/2021 | Ponnuru ........... G06F 9/44505 |

FOREIGN PATENT DOCUMENTS

| | | |
|---|---|---|
| GB | 2604003 A | 8/2022 |
| JP | 2022094948 A | 6/2022 |

OTHER PUBLICATIONS

Cheatham, Thomas J., Jungsoon P. Yoo, and Nancy J. Wahl. "Software testing: a machine learning experiment." Proceedings of the 1995 ACM 23rd annual conference on Computer science. 1995. (Year: 1995).*

Jogu, Kiran Kumar, and K. Narendar Reddy. "Cost Estimation Approach for Scrum Agile Software Process Model." Feb. 2018. (Year: 2018).*

Dagenais, Barthelemy, and Martin P. Robillard. "Recommending adaptive changes for framework evolution." ACM Transactions on Software Engineering and Methodology (TOSEM) 20.4 (2011): 1-35. (Year: 2011).*

Li et al., "CP-Miner: A Tool for Finding Copy-paste and Related Bugs in Operating System Code", USENIX Association OSDI '04: 6th Symposium on Operating Systems Design and Implementation, 2004, pp. 289-302.

Mell et al., "The NIST Definition of Cloud Computing", Recommendations of the National Institute of Standards and Technology, Special Publication 800-145, Sep. 2011, 7 pages.

Pravin et al., "An Efficient Programming Rule Extraction and Detection of Violations in Software Source Code using Neural Networks", IEEE Fourth International Conference on Advanced Computing (ICoAC) 2012, Dec. 13-15, 2012, 4 pages, Chennai, India.

Foreign Search Report, Patents Act 1977: Combined Search and Examination Report under Sections 17 and 18(3), Application No. GB2117266.3, Dated May 24, 2022, 7 pages.

Examination Report, Patents Act 1977: Examination Report under Section 18(3), Application No. GB2117266.3, Dated Aug. 22, 2022, 4 pages.

* cited by examiner

MACHINE LEARNING BASED DEPRECATED SOFTWARE IDENTIFICATION

TECHNICAL FIELD

The present invention relates generally to software maintenance, and more specifically, to tracking deprecated software and providing software test guidance based on usage.

BACKGROUND

Software under development, programming languages and their respective libraries may undergo spontaneous changes, forcing software development teams to update code to the latest versions. When software development teams are unable to keep pace with these changes because of misinformed priorities or resource constraints, they are potentially exposing their code to software vulnerabilities. Further, software testing is a perpetual task that increases the time between software releases and drains resources from other software related tasks.

Missing from the software development arena are tools that track the use of shared software across an organization with respect to the use of and removal of deprecated software modules and predictions related to software components and the amount of testing necessary to believe that a particular software module is sufficiently tested before release in a product or as a library.

BRIEF SUMMARY

According to an embodiment of the present invention, a computer-implemented method for identifying use of deprecated software source code in software repositories, the computer-implemented method comprising: parsing, by one or more processors, one or more software repositories for software source code identified as deprecated by a machine learning model; responsive to identifying deprecated software source code, alerting, by the one or more processors, a first one or more software developers responsible for maintaining a software source code module using the deprecated software source code; and recommending, by the one or more processors, an alternative software source code for use in the software source code module to replace the deprecated software source code to the first one or more software developers.

According to an embodiment of the present invention, a computer program product for identifying use of deprecated software source code in software repositories, the computer program product comprising: one or more non-transitory computer readable storage media and program instructions stored on the one or more non-transitory computer readable storage media, the program instructions comprising: program instructions to parse one or more software repositories for software source code identified as deprecated by a machine learning model; responsive to identifying deprecated software source code, program instructions to alert a first one or more software developers responsible for maintaining a software source code module using the deprecated software source code; and program instructions to recommend an alternative software source code for use in the software source code module to replace the deprecated software source code to the first one or more software developers.

According to an embodiment of the present invention, a computer system for identifying use of deprecated software source code in software repositories, the computer system comprising: one or more computer processors; one or more computer readable storage media; and program instructions stored on the one or more computer readable storage media for execution by at least one of the one or more processors, the program instructions comprising: program instructions to parse one or more software repositories for software source code identified as deprecated by a machine learning model; responsive to identifying deprecated software source code, program instructions to alert a first one or more software developers responsible for maintaining a software source code module using the deprecated software source code; and program instructions to recommend an alternative software source code for use in the software source code module to replace the deprecated software source code to the first one or more software developers.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of identifying deprecated modules of source code, redundant modules of source code and predicted levels of testing required for modules of source code based on enterprise wide use. It should be noted that the term software, as used herein, includes any type of computer instructions such as, but not limited to, firmware, microcode, etc.

Embodiments of the present invention can provide predictions, based on machine learning, of segments of deprecated source code. The predictions can include potential solutions, i.e., source code to replace the deprecated source code, based on source code replacing the same or similar source code in other parts of the same application or different applications. The embodiments can use static source code for training the models and do not inject any deprecated source code for training.

In another aspect, the embodiments can provide predictions on the amount of testing required for the source code replacing the deprecated source code. The amount of testing is based on factors such as, but not limited to, the number of locations the replacement source code is employed, the length of time the replacement source code has been deployed in similar functional areas, the volume of calls to the replacement source code, etc.

In one general embodiment, a computer-implemented method includes parsing, by one or more processors, one or more software repositories for software source code identified as deprecated by a machine learning model; responsive to identifying deprecated software source code, alerting, by the one or more processors, one or more software developers responsible for maintaining a software source code module containing the deprecated software source code; and recommending, by the one or more processors, an alternative software source code for use in the software source code module to replace the deprecated software source code.

In another general embodiment, a system includes a processor and logic integrated with the processor, executable by the processor, or integrated with and executable by the processor. The logic is configured to perform the foregoing computer-implemented method.

In another general embodiment, a computer program product for install-time software validation includes a computer-readable storage medium having program instructions embodied therewith. The program instructions are executable by a computer to cause the computer to perform the foregoing computer-implemented method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
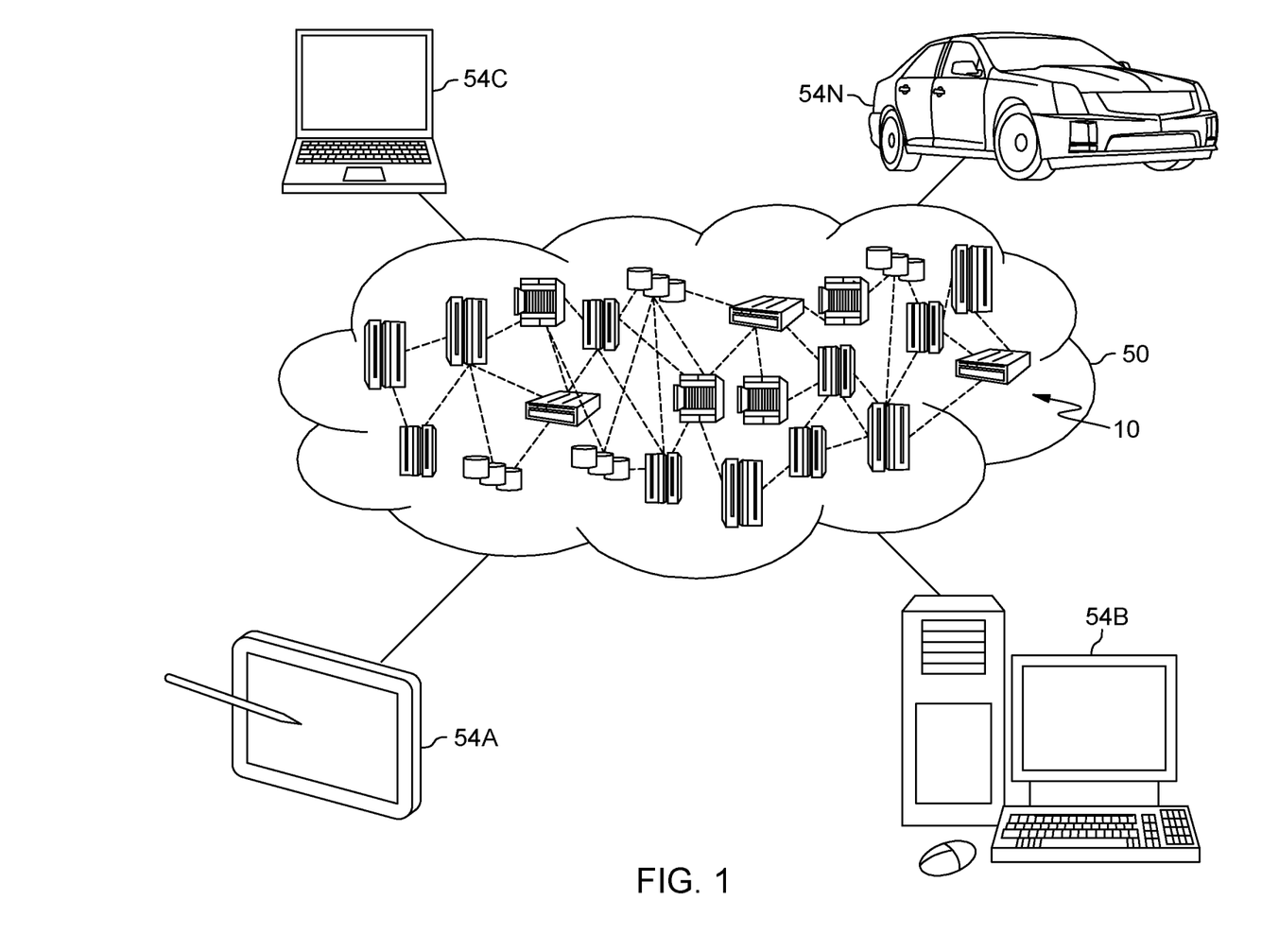
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
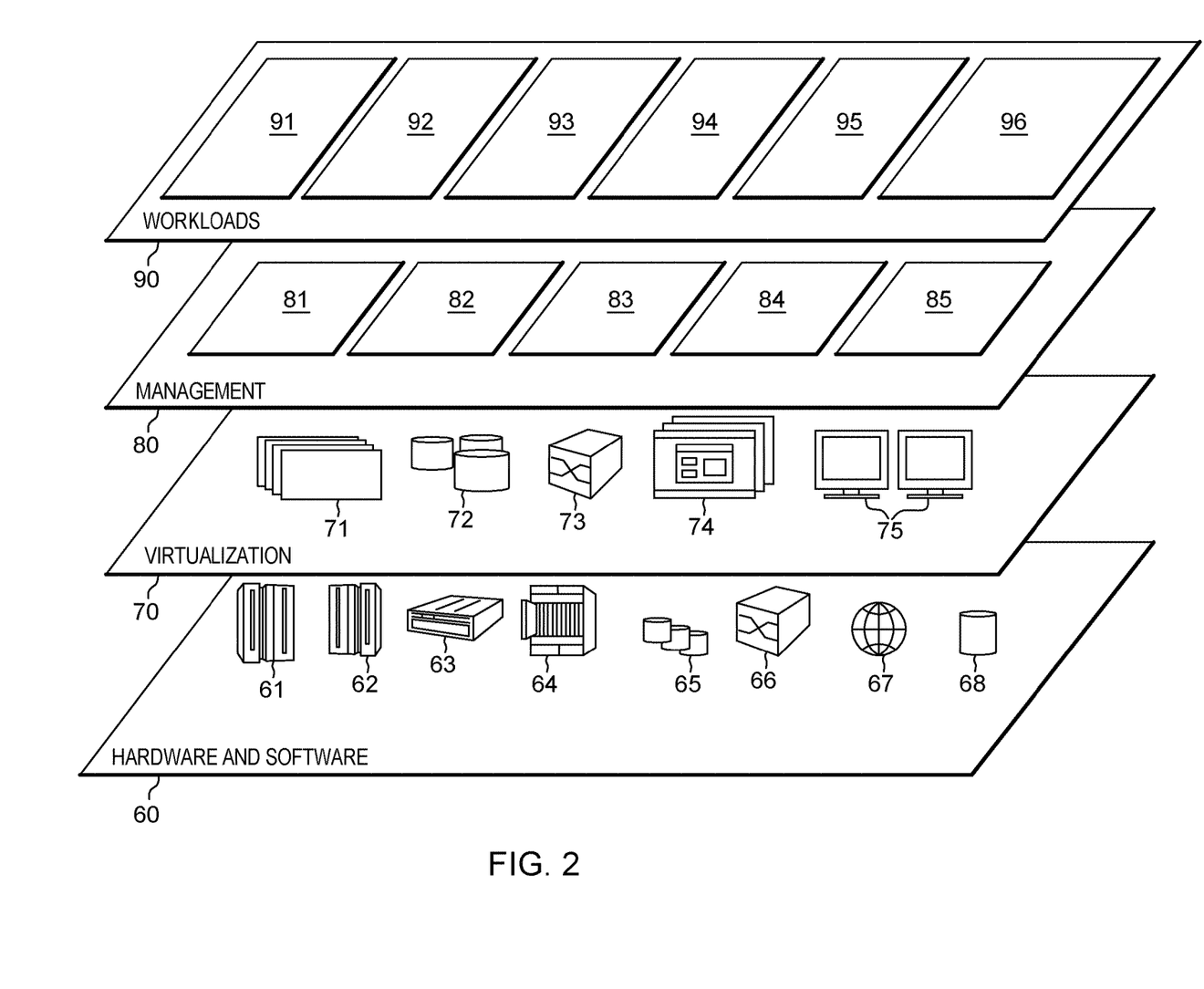
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and deprecated source code prediction 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
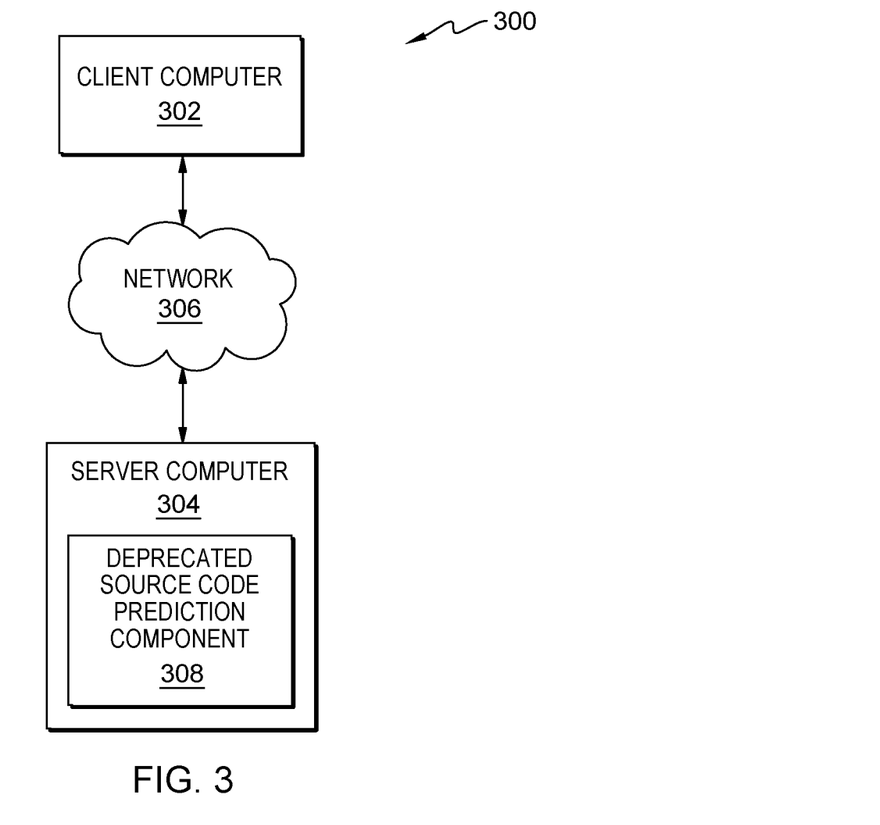
FIG. 3 is a high-level architecture, according to embodiments of the present invention.
Figure 4:
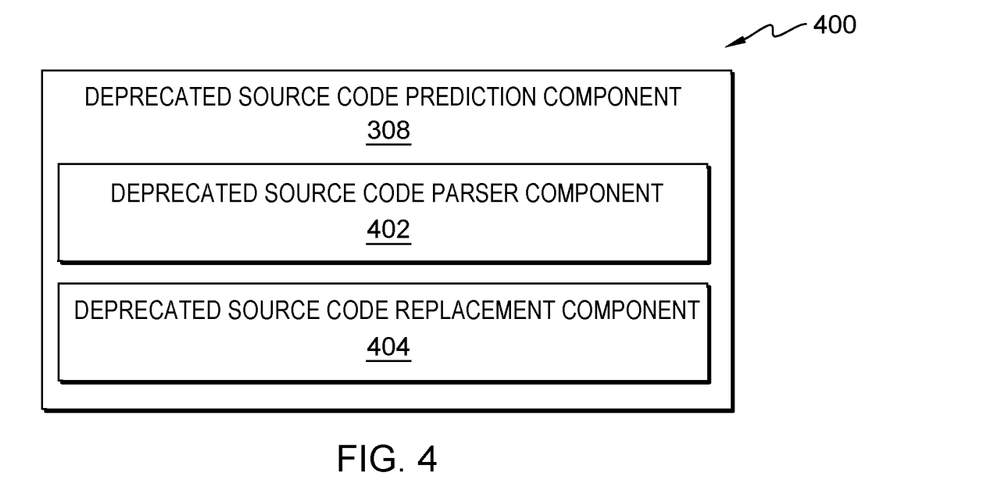
FIG. 4 is an exemplary detailed architecture, according to embodiments of the present invention.
Figure 5:
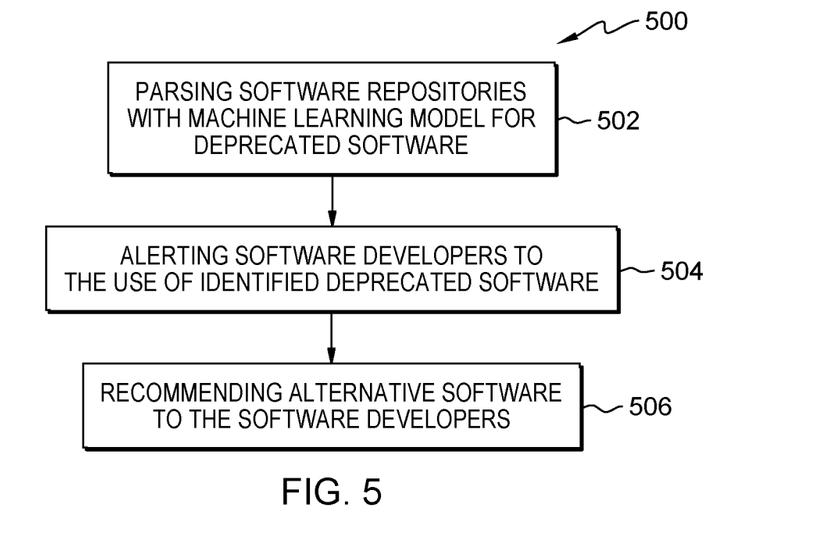
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram showing an exemplary processing system for identifying deprecated modules of source code, redundant modules of source code and predicted levels of testing required for modules of source code based on enterprise wide use environment to which the invention principles may be applied. The architecture 300 comprises a client computer 302, a deprecated source code prediction component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

Deprecated source code prediction component 308, operational on server computer 304, can locate sections of deprecated source code in software repositories based on machine learning of software developers responsible for the source code that is or will become deprecated. Deprecated source code prediction component 308 can make a determination regarding the identity and scope of deprecated source code either manually or automatically. Deprecated source code prediction component 308, based on the predicted identities od deprecated source code, can recommend replacements for the deprecated source code based on replacement source code employed in areas where the deprecated source code has already been replaced.

In another aspect, deprecated source code prediction component 308 can provide predictions on the level of unit and functional testing required on source code recommended to replace deprecated source code. The recommendations provided by deprecated source code prediction component 308 can be a starting point for implementing a testing plan for updated testing procedures based on following an implementation of a recommended replacement of deprecated source code.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a deprecated source code prediction component 308, which can further comprise a deprecated source code parser component 402 and a deprecated source code replacement component 404.

The deprecated source code parser component 402 can use a machine learning model to search enterprise-wide source code repositories for deprecated source code based on scanning and parsing the enterprise-wide source code repositories and performing comparison tests on the results. The machine learning model employed by deprecated source code parser component 402 can use static code for training. It should be noted that deprecated source code parser component 402 does not inject any deprecated source code for training the model. In one aspect, deprecated source code parser component 402 can use a predetermined mapping, prepared by manual software developer input, of locations of use of software source code modules that are subsequently identified as deprecated as a supplemental search list. In another aspect, deprecated source code parser component 402 can create metadata documents to summarize deprecated software and/or system components.

In another aspect, deprecated source code parser component 402 can identify deprecated source code based on comparing one repository to another with respect to source code functionality. For example, deprecated source code parser component 402 can identify functionally equivalent portions of code in different repositories and can uses source code change dates from the repositories to determine which location is newer. Deprecated source code parser component 402 can then look back in time in the source code repository with the newer functionally equivalent software to determine if the newer source code replaced the source code still in use in the software repository with the older software source code.

Deprecated source code replacement component 404 can recommend a predicted replacement for the deprecated software source code based on software source code the machine learning model has found replacing the deprecated software source code in other locations of the current repository or in other repositories accessible to the machine learning model via deprecated source code parser component 402. In one aspect, deprecated source code replacement component 404 can provide recommendations based on replacement software module identities manually entered by the software developers responsible for supporting the deprecated software source code. In another aspect, deprecated source code replacement component 404 can search public repositories for replacements for the deprecated code based on a functional analysis and present a list of predicted recommendations for evaluation. Further, deprecated source code replacement component 404 can leverage the machine learning models described above to create functionally equivalent source code to replace the deprecated source code.

Further, deprecated source code replacement component 404 can use the metadata documents to locate appropriate software developers responsible for the identified deprecated source code and/or system components. In another aspect deprecated source code replacement component 404 can alert the identified software developers based on automation tools, e.g., a tool comprising a continuous integration and continuous deployment pipeline.

Deprecated source code replacement component 404 can provide a visual representation to a software developer of software source code that is in use in source code they are presenting to a repository. For example, deprecated source code replacement component 404 can display a window of source code presented to a repository by the software developer wherein the sections of deprecated source code are highlighted. Further, deprecated source code replacement component 404 can display information that may include, but is not limited to, advising the software developer when the deprecated source code was retired and the reasoning for retiring the deprecated source code.

Deprecated source code replacement component 404 can provide predictions of the level of testing, both unit testing and functional testing, suggested for source code replacement of deprecated source code. Deprecated source code replacement component 404 can make these recommendations based on data associated with the recommended replacement source code such as, but not limited to, a length of time the replacement source code has been available, a number of installed uses of the replacement source code, a quality rating of the replacement source code, a number of anomalies corrected in the replacement source code, a trend of the rate of anomalies corrected in the replacement source code, etc.

FIG. 5 is an exemplary flowchart of a method 500 for identifying deprecated modules of source code, redundant modules of source code and predicted levels of testing required for modules of source code based on enterprise wide use. At step 502, an embodiment can parse, via deprecated source code parser component 402, software repositories with a machine learning model to find deprecated software source code. At step 504, the embodiment can alert, via deprecated source code replacement component 404, software developers to the use of deprecated software source code. At step 506, the embodiment can recommend, via deprecated source code replacement component 404, alternative software source code to the developers.

Figure 6:
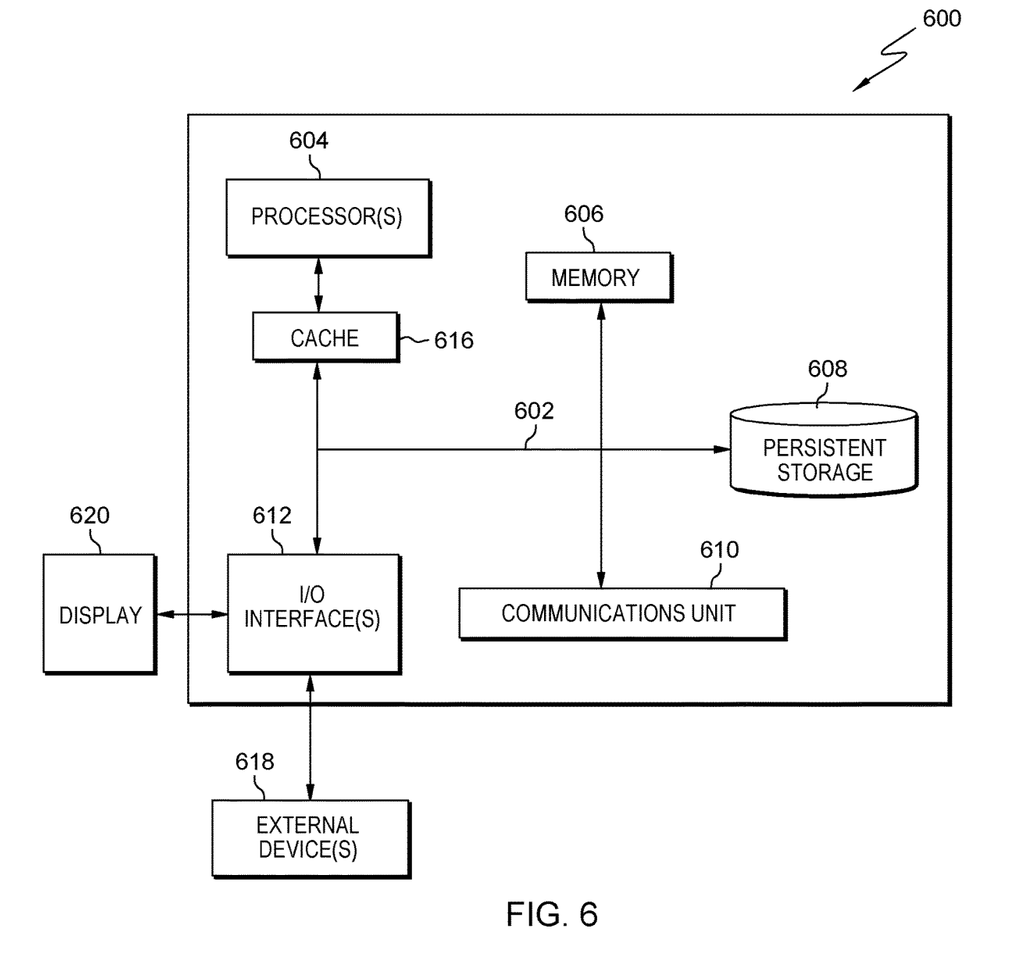
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O inter-face(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying use of deprecated software source code in software repositories, the computer-implemented method comprising:
   parsing, by one or more processors, one or more software repositories for software source code identified as deprecated by a machine learning model, wherein the machine learning model is trained with static source code without injecting deprecated source code;
   responsive to identifying deprecated software source code, alerting, by the one or more processors, a first one or more software developers responsible for maintaining a software source code module using the deprecated software source code; and
   recommending, by the one or more processors, an alternative software source code for use in the software source code module to replace the deprecated software source code, to the first one or more software developers,
   wherein the recommendation of the alternative software source code includes testing procedures and an indication of a level of testing required to replace the deprecated software source code with the alternative software source code, wherein the level of testing is determined based upon data associated with the alternative software source code comprising a length of time the alternative software source code has been available, a number of installed uses of the alternative software source code, a quality rating of the alternative software source code, a number of anomalies corrected in the alternative software source code and a trend of a rate of anomalies corrected in the alternative software source code.

2. The computer-implemented method of claim 1, further comprising:
   displaying, by the one or more processors, the deprecated software source code with highlighting.

3. The computer-implemented method of claim 1, wherein the alerting further comprises notifying a second one or more software developers responsible for supporting the deprecated software source code of an identity of the first one or more software developers using the deprecated software source code.

4. The computer-implemented method of claim 1, wherein the alerting further comprises providing the first one or more software developers with information comprising why the deprecated software source code is no longer supported and when the deprecated software source code was no longer supported.

5. The computer-implemented method of claim 1, wherein the alternative software source code is determined based on machine learning of a plurality of repositories.

6. The computer-implemented method of claim 1, wherein the alternative software source code is selected by a second one or more software developers responsible for supporting the deprecated software source code.

7. A computer program product for identifying use of deprecated software source code in software repositories, the computer program product comprising:
   one or more non-transitory computer readable storage media and program instructions stored on the one or more non-transitory computer readable storage media, the program instructions comprising:
   program instructions to parse one or more software repositories for software source code identified as deprecated by a machine learning model, wherein the machine learning model is trained with static source code without injecting deprecated source code;
   responsive to identifying deprecated software source code, program instructions to alert a first one or more software developers responsible for maintaining a software source code module using the deprecated software source code; and
   program instructions to recommend an alternative software source code for use in the software source code module to replace the deprecated software source code, to the first one or more software developers,
   wherein the recommendation of the alternative software source code includes testing procedures and an indication of a level of testing required to replace the deprecated software source code with the alternative software source code, wherein the level of testing is determined based upon data associated with the alternative software source code comprising a length of time the alternative software source code has been available, a number of installed uses of the alternative software source code, a quality rating of the alternative software source code, a number of anomalies corrected in the alternative software source code and a trend of a rate of anomalies corrected in the alternative software source code.

8. The computer program product of claim 7, further comprising:
   program instructions to display the deprecated software source code with highlighting.

9. The computer program product of claim 7, wherein the alert further comprises notifying a second one or more software developers responsible for supporting the deprecated software source code of an identity of the first one or more software developers using the deprecated software source code.

10. The computer program product of claim 7, wherein the alert further comprises providing the first one or more software developers with information comprising why the deprecated software source code is no longer supported and when the deprecated software source code was no longer supported.

11. The computer program product of claim 7, wherein the alternative software source code is determined based on machine learning of a plurality of repositories.

12. The computer program product of claim 7, wherein the alternative software source code is selected by a second one or more software developers responsible for supporting the deprecated software source code.

13. A computer system for identifying use of deprecated software source code in software repositories, the computer system comprising:
   one or more computer processors;
   one or more computer readable storage media; and
   program instructions stored on the one or more computer readable storage media for execution by at least one of the one or more processors, the program instructions comprising:
      program instructions to parse one or more software repositories for software source code identified as deprecated by a machine learning model, wherein the machine learning model is trained with static source code without injecting deprecated source code;
      responsive to identifying deprecated software source code, program instructions to alert a first one or more software developers responsible for maintaining a software source code module using the deprecated software source code; and
      program instructions to recommend an alternative software source code for use in the software source code module to replace the deprecated software source code, to the first one or more software developers,
   wherein the recommendation of the alternative software source code includes testing procedures and an indication of a level of testing required to replace the deprecated software source code with the alternative software source code, wherein the level of testing is determined based upon data associated with the alternative software source code comprising a length of time the alternative software source code has been available, a number of installed uses of the alternative software source code, a quality rating of the alternative software source code, a number of anomalies corrected in the alternative software source code and a trend of a rate of anomalies corrected in the alternative software source code.

14. The computer system of claim 13, further comprising:
   program instructions to display the deprecated software source code with highlighting.

15. The computer system of claim 13, wherein the alert further comprises notifying a second one or more software developers responsible for supporting the deprecated software source code of an identity of the first one or more software developers using the deprecated software source code.

16. The computer system of claim 13, wherein the alert further comprises providing the first one or more software developers information comprising why the deprecated software source code is no longer supported and when the deprecated software source code was no longer supported.

17. The computer system of claim 13, wherein the alternative software source code is either determined based on machine learning of a plurality of repositories or is selected by a second one or more software developers responsible for supporting the deprecated software source code.

* * * * *